United States Patent [19]

Manniso

[11] Patent Number: 4,916,110

[45] Date of Patent: Apr. 10, 1990

[54] MICROPOROUS CATALYTIC MATERIAL AND SUPPORT STRUCTURE

[75] Inventor: Jame L. Manniso, Newark, Del.

[73] Assignee: W. L. Gore & Associates, Inc., Newark, Del.

[21] Appl. No.: 265,632

[22] Filed: Nov. 1, 1988

[51] Int. Cl.$^4$ .................. B01J 23/00; B01J 23/42
[52] U.S. Cl. ................... 502/439; 502/159;
502/101; 502/182; 502/185; 502/339; 502/527;
204/14.1; 204/20
[58] Field of Search ............... 502/101, 159, 182, 185,
502/339, 439, 527; 204/14.1, 20

[56] References Cited

U.S. PATENT DOCUMENTS

| | | | |
|---|---|---|---|
| 3,235,473 | 2/1966 | Le Duc | 204/30 |
| 3,825,460 | 7/1974 | Yoshikawa et al. | 502/527 X |
| 4,204,918 | 5/1980 | McIntyre et al. | 204/24 |
| 4,557,957 | 12/1985 | Manniso | 428/36 |
| 4,637,990 | 1/1987 | Torobin | 502/527 X |
| 4,720,400 | 1/1988 | Manniso | 427/243 |

Primary Examiner—Patrick P. Garvin
Attorney, Agent, or Firm—Gary A. Samuels

[57] ABSTRACT

A microporous catalytic material and support prepared under a reducing atmosphere by pyrolysis of an interiorly metal-plated porous polymer to leave the residual microporous tubular-configured metal sheaths of the nodes, fibrils, or other surfaces within the interior of the resulting hollow structure.

12 Claims, 1 Drawing Sheet

MICROPOROUS CATALYTIC MATERIAL AND SUPPORT STRUCTURE

FIELD OF THE INVENTION

The invention relates to catalytic materials, specifically microporous catalytic materials which can alternatively serve as a support for catalytic materials.

BACKGROUND OF THE INVENTION

Catalytic materials, such as supported metal catalysts, are usually prepared by impregnating a porous high surface area support medium with a salt of the catalytic metal in solution or ion-exchanging atoms of the catalytic metal for certain of those of the support medium.

In the case of salt impregnation, the pores of the support medium are impregnated with sufficient solution to coat the outside of the support medium if a surface shell of metal around the outside of the catalyst particle is wanted or the support medium may be completely soaked in the metal salt solution, the support particles drained, dried, and calcined in air to convent the metal salt to the corresponding oxide. The oxide is reduced by hydrogen to the zero valent metal atoms at the sites of the oxide particles on the surface or within the pores of the particles of support medium.

In the ion exchange method, complexed catalyst metal atoms replace acidic hydrogen atoms of the support medium, the support is washed with deionized water to remove all free salt, the support dried, calcined, and reduced. Catalysts prepared as above have the metal dispersed on surface of the support, including inside the pores, as small crystallites of varying sizes.

Another type of catalytic material is porous metal-platable materials, used in electrochemical catalytic reactions such as fuel cells, electrochemical production or as electrodes for other reactions. Processes for chemical plating the surface of and within the pores of solid polymer materials have been used to make electrodes for fuel cells, for instance, by LeDuc, as shown in U.S. Pat. No. 3,235,473, where a continuous layer of silver was deposited from solution on the surface and within the pores of polyethylene. An electroplating process disclosed in U.S. Pat. No. 4,204,918 plated metal onto the walls of the void spaces in porous metal sheets, such as nickel, to provide porous catalytic materials.

The preferred materials for use as starting materials in the present invention and the process for making them are those disclosed in U.S. Pat. Nos. 4,557,957 and 4,720,400, issued to the present inventor and the two references are hereby incorporated by reference. The patents describe microporous polytetrafluoroethylene (PTFE) articles, having a microstructure of nodes interconnected by fibrils in which a continuous metal coating plates and incapsulates nodes and fibrils of the microporous PTFE structure, while maintaining substantially the original porosity of the unplated microporous PTFE from which the metal-plated articles were formed.

BRIEF SUMMARY OF THE INVENTION

The invention is a microporous catalytic material which can be a support structure for other catalytic material. The material is a three-dimensional tubular network of microporous metal which comprises the residue of the continuous metal plated nodes and fibrils of the interior of a metal-plated segment of microporous polymeric material, such as PTFE, which has been pyrolyzed to remove the PTFE. The network may be used as is as a catalyst if the plating is by use of a catalytic metal and if pyrolysis has been under reducing conditions. If the network is to serve as a carrier, another different catalytic metal may be plated on the surfaces of the metal residue.

DESCRIPTION OF THE PREFERRED EMBODIMENTS

Figure 1:
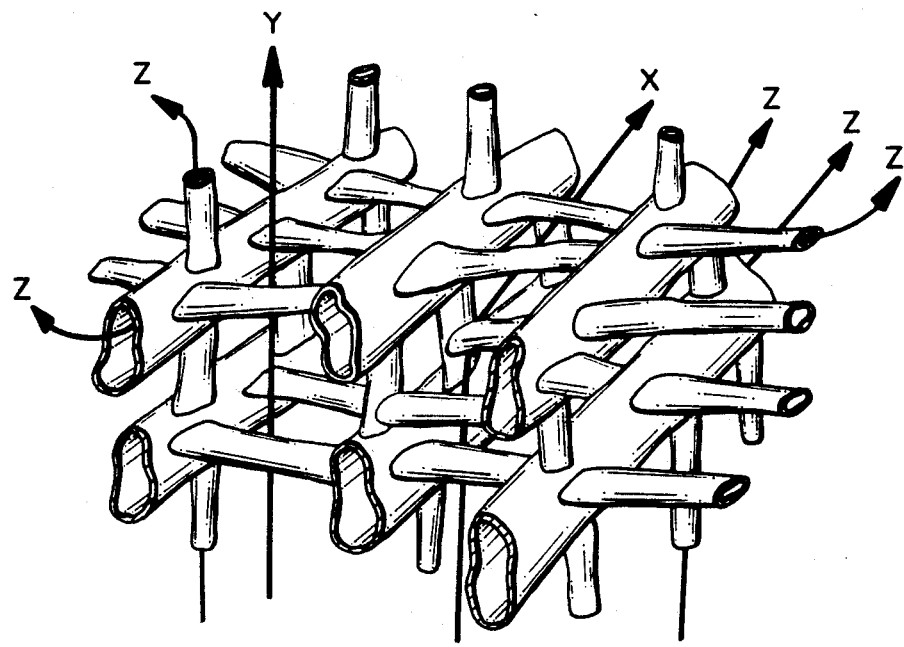
FIG. 1 shows a segment of pyrolyzed three-dimensional catalyst and support structure of the invention with fluid flow through and around it.
Figure 2:
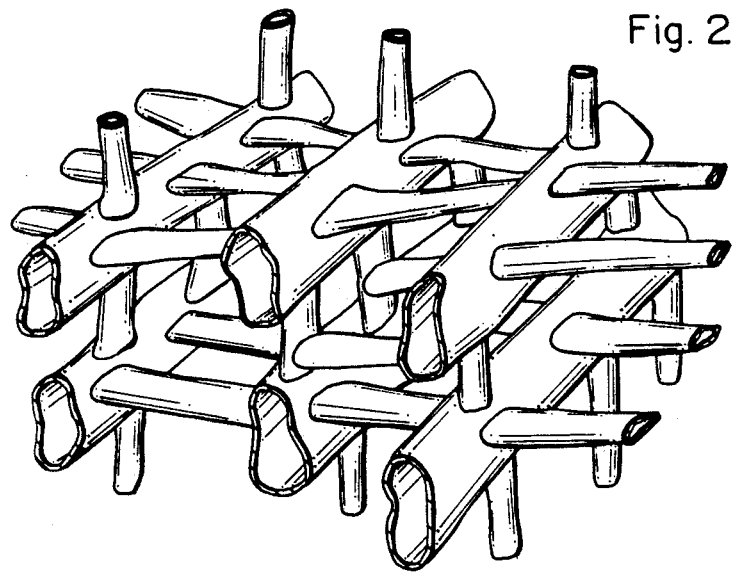
FIG. 2 shows a segment of network.

With reference now to the Figures, FIG. 1 shows a microstructure composed of hollow metal nodes and interconnected hollow fibrils. A fluid flow is depicted through the segment of metallized microstructure in the X,Y, and Z directions, with the Z direction being through the hollow inside of the tubing making up the microstructure. The Z direction fluid flow may be one of diffusion and because of the small pore sizes of the inside hollow microstructure apertures, molecular separation may occur in that only molecules of sizes small enough to diffuse inside this microstructure will pass inside and separate from other molecules. Those molecules that diffuse inside may contact catalytic metal atoms or crystallites plated on the inside of these very small tubes or pores. The metal surface on the inside of the tubes can be the same or different from that on the outside of the tubes of the microstructure and can be chosen for the specific catalytic reactions desired. Such use of different metals for catalytic reactions is known as bimetallic catalysis. The Z microstructure pore size can be controlled for desired molecular size ranges by selecting the porous expanded PTFE membrane for its initial node and fibril diameter, so that when the PTFE is pyrolyzed from the metallized membrane, the hollow pores formed by removal of the PTFE by pyrolysis will be in the desired molecular size ranges.

To manufacture the above metallic microstructure, porous expanded PTFE membranes, which have been prepared according to U.S. Pat. No. 3,953,566, are metal-plated with platinum or platinum black, for instance, or another catalytic metal by the methods disclosed in U.S. Pat. Nos. 4,557,957 and 4,720,400 and several sheets of the metallized material placed between two fine-meshed metal screens. The screen-supported sandwich construction holding the metallized membranes may be flat planar or cylindrical, and may be build up in layers or spirally wound, or in any useful shape. The construction is placed in a hydrogen gas-purged furnace and the temperature raised to at least the pyrolysis temperature of PTFE. The temperature is held until the PTFE is completely pyrolyzed to leave only the intact node and fibril shaped metal microstructure inside the supporting screens. This structure can be used as is, as a microporous catalytic material or as a catalytic support material which can be further electroplated or chemically plated with platinum or platinum black or other catalytic metal on the outside or on the inside of the hollow nodes and fibrils of metal according to the methods of the above patents.

An example of a way to provide different catalytic metals inside than outside of the material is to first lay down a layer of platium-palladium-tin mixed plating according to a metalling process of U.S. Pat. No. 4,720,400 on the surface of the nodes and fibrils of a piece of porous expanded PTFE. This is followed by plating on in order layer of nickel, platinum black, platinum, and gold. The plated material is then pyrolyzed above the decomposition point of PTFE to complete elimination of the PTFE to leave a tubular material having hollow nodes and fibrils, nickel coated inside and gold coated outside. An acid solution can be used to remove the nickel from the interior of the hollow material without disturbing the outside coating of gold to yield a catalytic material having platinum black on the inside and gold on the outside. By proper ordering of plated-on layers one can then selectively remove layers by appropriately selected means to remove them when desired by acid wash or other means, such as an organic complexing agent.

This electroplatable or chemically platable porous microstructure of the PTFE membrane starting material consists of nodes interconnected by very fibrils which are affected in size, shape, and length by the conditions of temperature, rate of stretch, and the temperature and time of heat setting of the stretched material. The fibrils may vary from about 5 angstroms to about 1000 angstroms in width and the nodes may be less than 1 micron to about 400 microns across and these materials produced at high temperature and stretch rates have smaller more closely spaced nodes, more interconnecting fibrils, and greater strength. The initial surface area of the PTFE membrane starting materials range from 5-10 square meters per gram of material. However, when catalytic metals of different surface area are deposited on the PTFE membrane microstructure, the surface areas can be increased, thereby providing controlled catalytically active sites for specific catalytic reactions.

Various screening or other porous supports to hold the metallized membrane for pyrolysis and use afterwards can be utilized. Support materials such as stainless steel, Hastelloy, Inconnel, platinum, gold, ceramics, and refractory metals and alloys generally which are chemically resistant to attack by the pyrolysis products of PTFE and heatable while retaining adequate strength to and beyond the pyrolysis temperature of PTFE can be utilized. The heating generally takes place in an electric induction furnace in a reducing environment, usually hydrogen, and the pyrolysis products of PTFE are removed by hydrogen purging.

The prepared catalytic material may be used as is in the screens in flat, cylindrical, or other useful shapes for catalysis of fluid phase reactions and the plating process may be repeated to provide thicker metal layers which can serve to support themselves.

The preferred material for making the catalyst of the invention is the metallized porous expanded PTFE described in the two patents above, but any other porous material which can be plated in its interior interstices upon node-like and fiber-like arrangements and configurations obtained by stretching the material, such as an organic polymer other than PTFE, or other materials that are manufactured by other methods or are naturally occurring materials having microporous configurations and are metal-platable and amenable to pyrolysis can also be utilized to make the catalytic material of the invention. A filled substrate from which the fill has been solubilized might be used.

It will be apparent to those skilled in the art that various modifications and changes could be made without departing from the scope of the invention, the boundaries of which are delineated by the appended claims.

I claim:

1. A microporous catalytic material and support structure for catalytic material comprising a three-dimensional tubular network of metal having micropores throughout, which network comprises the hollow tubular residue of continuous metal plated nodes and fibrils of the interstices of a microporous polymeric material which has been pyrolyzed to remove all materials except said metal material.

2. A catalytic material of claim 1 prepared from a metallized microporous synthetic organic polymer material.

3. A catalytic material of claim 2 wherein the polymer is polytetrafluoroethylene.

4. A catalytic material of claim 1 prepared from a metallized naturally occurring pyrolyzable porous material.

5. A catalytic material of claim 1, 2, 3, or 4, wherein a catalytic metal is plated on said catalytic material as a support structure.

6. A process for preparing a microporous catalytic material and support structure which comprises a three-dimensional network of tubular metal configurations corresponding to the surfaces of the nodes, fibrils, and other surface of the interstices of a microporous polymeric material comprising the steps of:
    (a) metal plating the surfaces of the nodes, fibrils, or other surfaces of a microporous material;
    (b) placing said plated material between porous supporting means;
    (c) pyrolyzing the supported plated microporous material at a temperature and for a time to completely remove all non-metal material; and optionally
    (d) chemically removing one or more interior or outer layers of metal.

7. A process of claim 6 wherein the plating process is by electroplating.

8. A process of claim 6 wherein the plating process is by chemical electroless plating.

9. A process of claims 6, 7, or 8 wherein the pyrolysis is carried out in a reducing atmosphere.

10. A process of claims 6, 7 or 8, wherein the plating process is selectively repeated to build up metal layers in a predetermined order to provide following step (c) selectively chosen metal surfaces on the inside and outside of the material.

11. A process of repeating steps (a), (c), and (d) of the process of claims 6, 7, or 8, as a means of providing support for the catalytic material.

12. A process of claim 6 wherein a less-nobel metal layer is removed from the catalytic material by an acid wash or treatment with an organic metal-complexing agent.

* * * * *